(12) United States Patent
Bird et al.

(10) Patent No.: US 7,953,697 B2
(45) Date of Patent: May 31, 2011

(54) SYSTEM AND METHOD FOR COLLABORATIVE INFORMATION DEVELOPMENT

(75) Inventors: Colin Leonard Bird, Eastleigh (GB); John Bryan Ibbotson, Salisbury (GB)

(73) Assignee: International Business Machines Corporation, Armonk, NY (US)

( * ) Notice: Subject to any disclaimer, the term of this patent is extended or adjusted under 35 U.S.C. 154(b) by 475 days.

(21) Appl. No.: 12/110,697

(22) Filed: Apr. 28, 2008

(65) Prior Publication Data
US 2009/0271430 A1 Oct. 29, 2009

(51) Int. Cl.
*G06F 17/30* (2006.01)
(52) U.S. Cl. .................. 707/608; 707/784; 715/233
(58) Field of Classification Search .................. 707/802, 707/608, 784; 715/233
See application file for complete search history.

(56) References Cited

U.S. PATENT DOCUMENTS

2009/0070350 A1* 3/2009 Wang .............................. 707/100
2009/0132651 A1* 5/2009 Roger et al. ................... 709/204
2009/0216578 A1* 8/2009 Bechtel et al. ..................... 705/7

OTHER PUBLICATIONS

Revision history of Reviewed article version. [online]. 2 pages. [retrieved on Apr. 28, 2008]. Retrieved from the Internet:< URL: http://meta.wikimedia.org/wiki/Reviewed_article_version>.

* cited by examiner

*Primary Examiner* — Cheryl Lewis
(74) *Attorney, Agent, or Firm* — Schmeiser, Olsen & Watts; Andre Gibbs

(57) ABSTRACT

A system and associated method for collaboratively developing information. An information delivery system for information regarding rapidly evolving software products builds an initial information set and a vocabulary. The initial information set is released for annotations on the information set by contributing users. The vocabulary defines a group of terms and respectively associated confidence level that can be used in describing annotations. An access control list may be employed in authenticating contributing users in accessing the information delivery system to assure reliability of annotations. A reliable annotation having a confidence level satisfying a threshold confidence level is integrated with the information set according to an approval by a content owner.

20 Claims, 4 Drawing Sheets

US 7,953,697 B2

SYSTEM AND METHOD FOR COLLABORATIVE INFORMATION DEVELOPMENT

FIELD OF THE INVENTION

The present invention discloses a system and associated method for collaboratively developing information that supports a rapidly evolving software product.

BACKGROUND OF THE INVENTION

To keep up with shortening development and/or release cycles of information technology (IT) products, supporting documentation for such IT products also should be rapidly and accurately developed. Conventional methods for developing supporting documentation usually lag behind the latest functionalities of the products. Collaborative development of supporting documentation within an informed community may keep supporting documentation up-to-date with IT products, but an access to and quality of supporting documentation should be controlled to create reliable supporting documentation.

Thus, there is a need for a system and associated method that overcomes at least one of the preceding disadvantages of current methods and systems for developing supporting documentation of evolving IT products.

SUMMARY OF THE INVENTION

The present invention provides a method for collaboratively developing information, the method comprising:

storing an information set and a vocabulary in an information delivery system data storage, wherein the information set comprises at least one item, wherein the vocabulary defined by an owner comprises at least one pair of a term and a respective confidence level associated with the term, wherein the respective confidence level determined by the owner represents how reliable an assertion comprising the term is;

subsequent to said storing, receiving at least one annotation with respect to an item of said at least one item from a user, wherein each annotation of said at least one annotation comprises a respective assertion and a respective user identifier; and subsequent to said receiving, integrating the item with said at least one annotation according to the respective confidence level of the respective assertion in said at least one annotation and the respective user identifier in said at least one annotation such that the integrated item replaces the item within the information set, wherein said storing, said receiving, and said integrating are performed by an information delivery system program.

The present invention provides a computer program product, comprising a computer usable storage medium having a computer readable program code embodied therein, said computer readable program code containing instructions that when executed by a processor of a computer system implement a method for collaboratively developing information, the method comprising:

storing an information set and a vocabulary in an information delivery system data storage, wherein the information set comprises at least one item, wherein the vocabulary defined by an owner comprises at least one pair of a term and a respective confidence level associated with the term, wherein the respective confidence level determined by the owner represents how reliable an assertion comprising the term is;

subsequent to said storing, receiving at least one annotation with respect to an item of said at least one item from a user, wherein each annotation of said at least one annotation comprises a respective assertion and a respective user identifier; and subsequent to said receiving, integrating the item with said at least one annotation according to the respective confidence level of the respective assertion in said at least one annotation and the respective user identifier in said at least one annotation such that the integrated item replaces the item within the information set, wherein said storing, said receiving, and said integrating are performed by an information delivery system program.

The present invention provides a computer system comprising a processor and a computer readable memory unit coupled to the processor, said memory unit containing instructions that when executed by the processor implement a method for collaboratively developing information, the method comprising:

storing an information set and a vocabulary in an information delivery system data storage, wherein the information set comprises at least one item, wherein the vocabulary defined by an owner comprises at least one pair of a term and a respective confidence level associated with the term, wherein the respective confidence level determined by the owner represents how reliable an assertion comprising the term is;

subsequent to said storing, receiving at least one annotation with respect to an item of said at least one item from a user, wherein each annotation of said at least one annotation comprises a respective assertion and a respective user identifier; and subsequent to said receiving, integrating the item with said at least one annotation according to the respective confidence level of the respective assertion in said at least one annotation and the respective user identifier in said at least one annotation such that the integrated item replaces the item within the information set, wherein said storing, said receiving, and said integrating are performed by an information delivery system program.

The present invention provides a method and system that overcomes at least one of the current disadvantages of conventional method and system for collaborative information development within an informed user community.

DETAILED DESCRIPTION OF THE INVENTION

Figure 1:
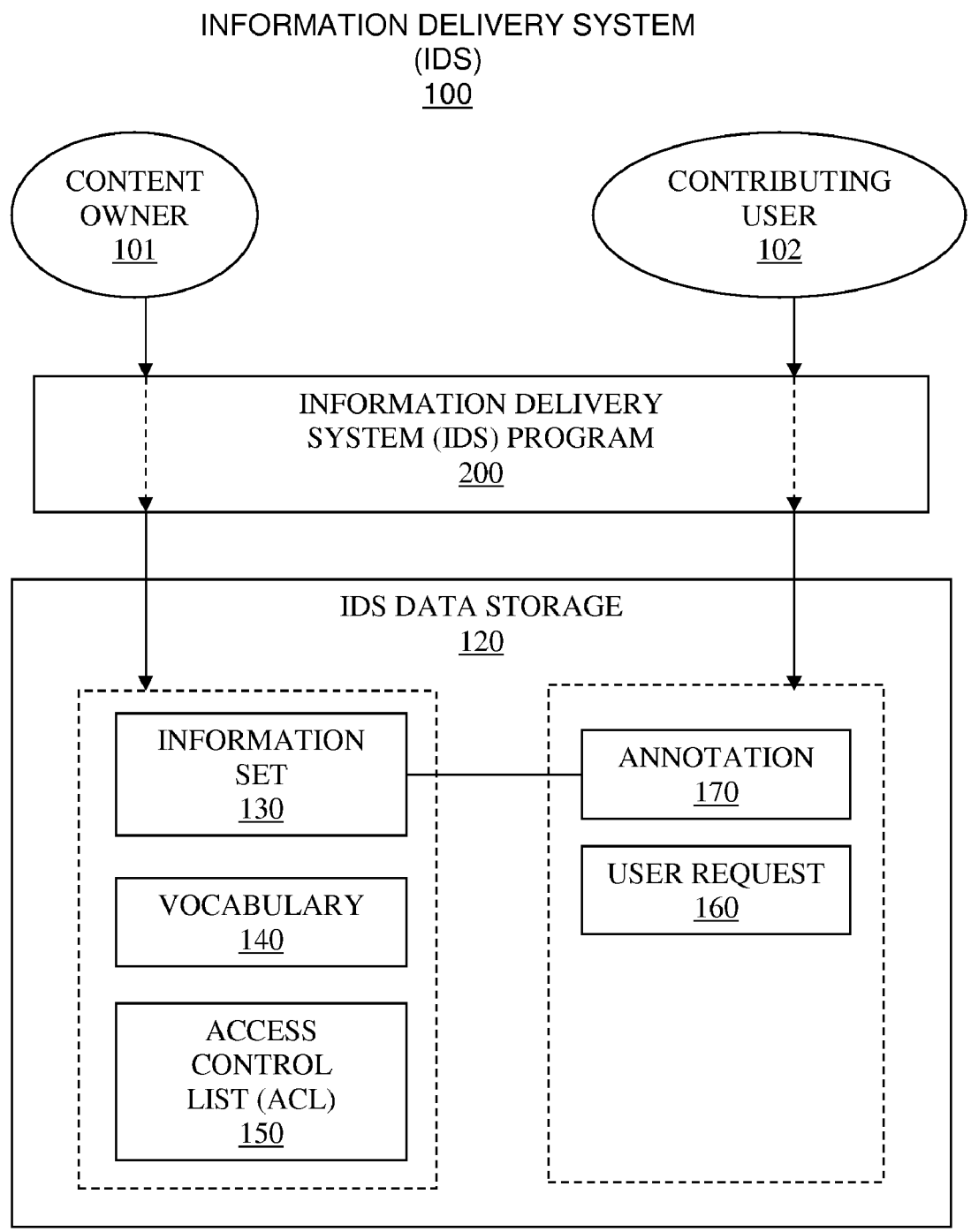
FIG. 1 illustrates an information delivery system, in accordance with embodiments of the present invention.

FIG. 1 illustrates an information delivery system 100, in accordance with embodiments of the present invention.

The information delivery system (IDS) 100 comprises a content owner 101, a contributing user 102, an information delivery system (IDS) program 200, and IDS data storage 120. The IDS data storage 120 comprises an information set 130, a vocabulary 140, an access control list (ACL) 150, a user request 160, and an annotation 170.

The content owner 101 is an individual or an organization that generates, provides, owns, and manages the information set 130. The content owner 101 is responsible for the trustworthiness and/or reliability of the information set 130. The content owner and an owner are used interchangeably in this specification.

The contributing user 102 is a member of a user community that contributes annotation 170 for the information set 130. The contributing user 102 gains an access to the IDS data storage 120 through an authorization to all or individual members of the user community pursuant to the access control list 150. Members of the user community may include, inter alia, product developers and/or integrators, information providers, end users, etc. The contributing user and a user are used interchangeably in this specification.

The information delivery system (IDS) program 200 receives and processes data provided by the content owner 101 and the contributing user 102, and stores data in the IDS data storage 120. See FIG. 2, infra, for details.

The information set 130 comprises at least one item of information that describes a subject that is managed by the content owner 101. An item of information is an individual document or a collection of documents in any format that may be employed in the information delivery system (IDS) 100 describing the subject. Examples of the subject may be, inter alia, a web domain description, supporting documentations for an information technology product, patch files for software upgrade and accompanying installation guide, etc.

The vocabulary 140 and the annotation 170 comprise at least one assertion. An assertion is a tuple (term, confidence level), where "term" is at least one word used in describing the subject and "confidence level" is a numeric value associated with "term." The confidence level in an instance of assertion represents a level of confidence of a user who makes the assertion. The confidence level may be represented as, inter alia, an enumerated list of discrete values, a list of specific words having a respectively assigned values, a scale of 1 to 10, a percentage measure, etc. In one embodiment, wherein the information set 130 comprises software installation instructions for a first platform, the content owner generates a new information set comprising software installation instructions for a second platform. The content owner may assign a greater confidence level for a first assertion, for example, 90%, that describes a first installation method that the content owner had performed and succeeded than a confidence level of a second installation method, for example, 60%, that the content owner has no direct knowledge about the outcome.

The vocabulary 140 is a non-extensible set of assertions that are selected by the content owner 101 and allowed in information set 130. Assertions in the vocabulary 140 specify terms that are used in determining the confidence level of assertions in the annotation 170. Examples of terms indicating various confidence levels may include, inter alia, "Bet my salary on it," "High," "Should work," "Not sure," "Just guessing," etc. Each term may be associated with a respective numeric value.

The access control list (ACL) 150 comprises identification information that identifies contributing users who have respective accesses to the IDS 100. Examples of identification information in the ACL 150 may include, inter alia, electronic signatures, etc. The ACL 150 is used in authenticating users attempting to access the IDS 100. In one embodiment, the ACL 150 may be null if the content owner determines that the information set need no authentication to receive annotation from users or to perform users' search requests against the information set. In another embodiment, the ACL 150 comprises permitted contributing users and each contributing user who has an access to the IDS also has a prescribed level of authority indicating the reliability of the annotation provided by the contributing user.

The user request 160 comprises a search request from the contributing user 102. The search request may comprise a confidence level as a search condition such that a user requests information with a desired confidence level. In one embodiment, the user request 160 may further comprise an access control list (ACL) entry request that is sent by the contributing user 102 to be enlisted in the access control list (ACL) to access the IDS 100.

The annotation 170 to existing items of information in the information set 130 is provided mainly by the contributing user 102, or occasionally by the content owner 101. The annotation 170 comprises a data fragment and a respective provenance assertion for the data fragment. The data fragment is a piece of text and/or multimedia file that may be employed in the IDS data storage 120. The data fragment may include items of information in the information set 130. The respective provenance assertion comprises an assertion and a user identifier that identifies who created the annotation. The respective provenance assertion authenticates the annotation by verifying the user identifier.

Figure 2:
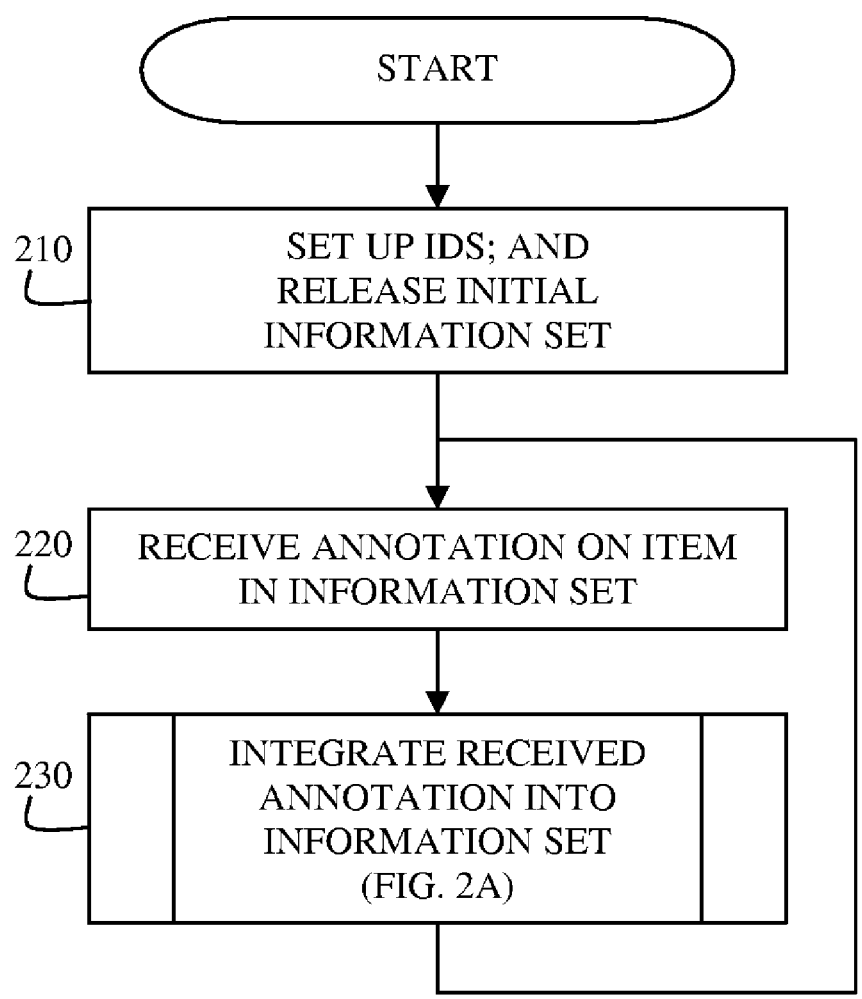
FIG. 2 is a flowchart depicting a method for the information delivery system (IDS) of FIG. 1, in accordance with the embodiments of the present invention.

FIG. 2 is a flowchart depicting a method for the information delivery system (IDS) of FIG. 1, supra, in accordance with the embodiments of the present invention. The method of the information delivery system (IDS) supports a software development cycle that is widely adopted by projects for rapid software development. A rapid development cycle is typically one (1) month during which software prototypes are modified for assessment by an end user community. The method of the present invention enables supporting information related to all steps of the software development cycle to be developed in a timescale that matches the software development cycle. The IDS regulates the information set according to provenance assertions in annotations associated with respective items of information.

In step 210, the information delivery system (IDS) program sets up the information delivery system and releases an initial information set to be viewed and annotated by users. In setting up the IDS, the IDS program receives the vocabulary and the initial information set from input by the content owner and stores the vocabulary and the information set in the IDS data storage. The initial information set is released with read-only permission for commentators/users to make comments about the information set by providing annotation inputs.

In step 220, the IDS program receives an annotation on items in the released information set and/or annotations that are already posted. In one embodiment, users have unrestrained access to the IDS for a rapid development of information. In another embodiment of the present invention, the information delivery system employs an access control list to assure the identity of a user who posts an annotation and to guarantee reliability of posted annotations to be used by other users.

In step 230, the IDS program integrates the annotation received in step 220 into the information set. See FIG. 2A, infra, for details. In one embodiment of the present invention, the IDS program periodically integrates multiple annotations received during a period of time by prompting the content owner to initiate the integrating process.

Figure 2A:
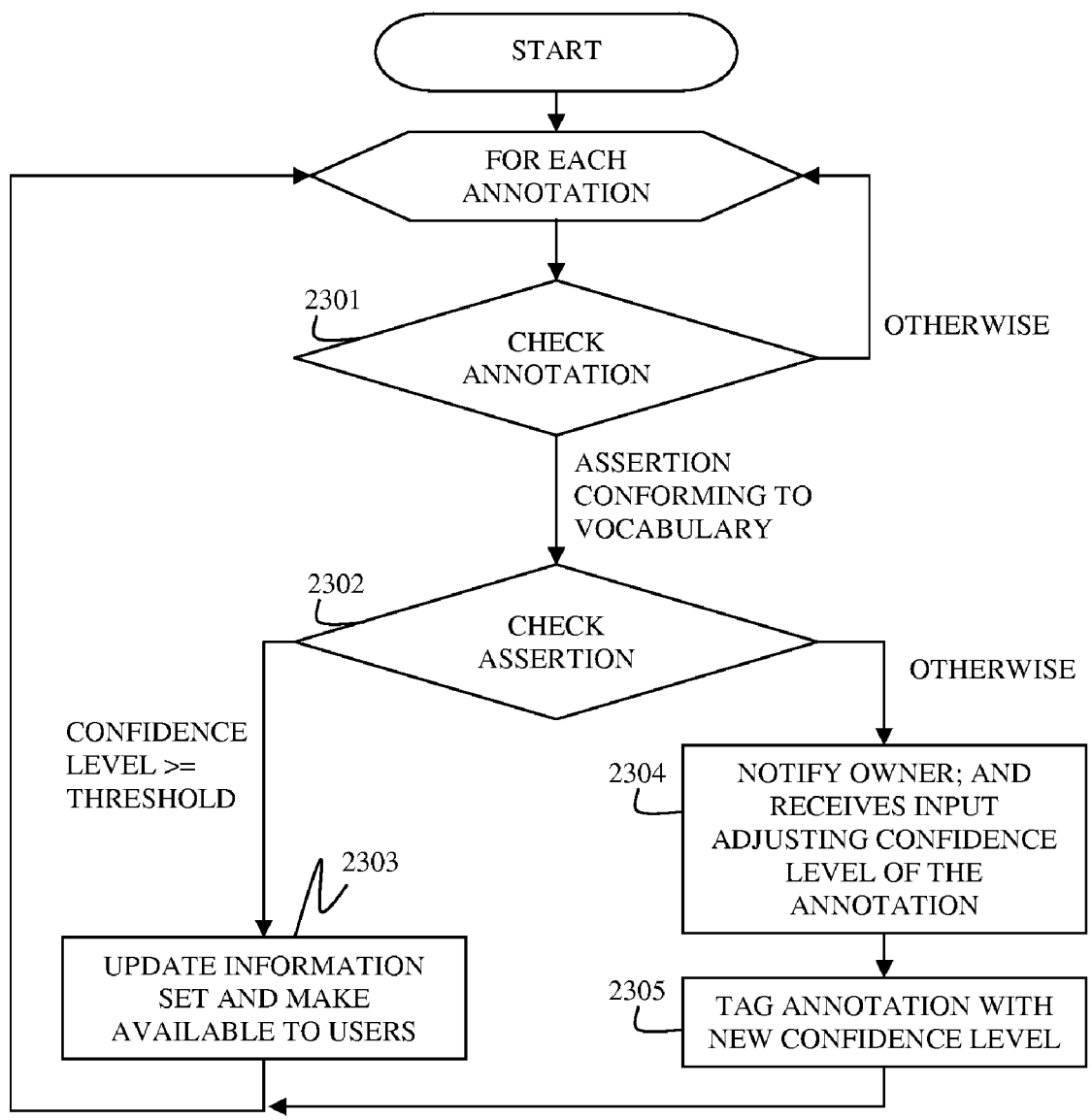
FIG. 2A is a flowchart depicting step 230 of FIG. 2, that integrates an annotation into the information set, in accordance with the embodiments of the present invention.

FIG. 2A is a flowchart depicting step 230 of FIG. 2, supra, that integrates an annotation into the information set, in accordance with the embodiments of the present invention.

In step 2301, the IDS program determines whether an assertion comprised by the annotation conforms to the vocabulary. If the IDS program determines that the assertion conforms to the vocabulary, then the IDS program proceeds to step 2302. If the IDS program determines that the assertion does not conform to the vocabulary, then the IDS program selects a next annotation to be integrated.

In step 2302, the IDS program compares a threshold confidence level defined by the content owner with a respective confidence level of the assertion. If the IDS program determines that the respective confidence level of the assertion is greater than or equal to the threshold confidence level, then the IDS proceeds to step 2303. If the IDS program determines that the respective confidence level of the assertion is less than the threshold confidence level, then the IDS proceeds to step 2304.

In one embodiment of the present invention, the IDS program checks for a user identifier of the contributing user who had provided the annotation against an access control list.

In step 2303, the IDS program updates the information set to include the annotation associated with an item within the information set, because the annotation is determined to be reliable based on the threshold confidence level. Subsequently, the IDS program makes the updated information set available to users for further annotation.

In step 2304, the IDS program notifies the content owner to handle the annotation with a confidence level lower than the threshold confidence level. The IDS program subsequently may receive an input by content owner that adjusts the confidence level of the annotation.

In step 2305, the IDS program tags the annotation with the new confidence level provided by the content owner, responsive to receiving the input adjusting the confidence level of the annotation.

In one embodiment of the present invention, the information delivery system program employs a web interface in servicing users. The present embodiment also employs a read-only release to contributing users of a subset of the information set.

Figure 3:
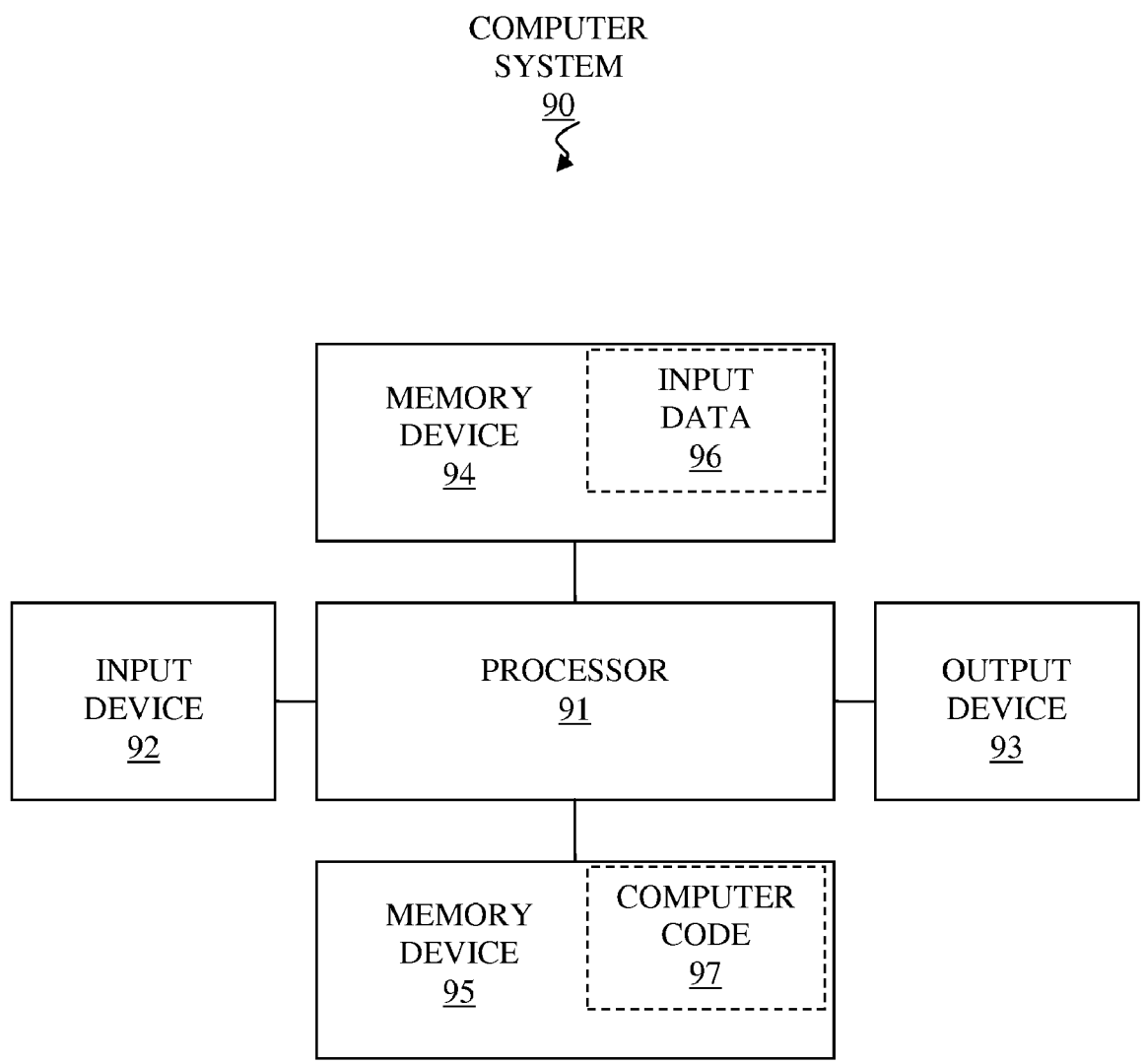
FIG. 3 illustrates a computer system used for the information delivery system, in accordance with embodiments of the present invention.

FIG. 3 illustrates a computer system 90 used for the information delivery system, in accordance with embodiments of the present invention.

The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, a keypad, a touchscreen, a voice recognition device, a sensor, a network interface card (NIC), a Voice/video over Internet Protocol (VOIP) adapter, a wireless adapter, a telephone adapter, a dedicated circuit adapter, etc. The output device 93 may be, inter alia, a printer, a plotter, a computer screen, a magnetic tape, a removable hard disk, a floppy disk, a NIC, a VOIP adapter, a wireless adapter, a telephone adapter, a dedicated circuit adapter, an audio and/or visual signal generator, a light emitting diode (LED), etc. The memory devices 94 and 95 may be, inter alia, a cache, a dynamic random access memory (DRAM), a read-only memory (ROM), a hard disk, a floppy disk, a magnetic tape, an optical storage such as a compact disk (CD) or a digital video disk (DVD), etc. The memory device 95 includes a computer code 97 which is a computer program that comprises computer-executable instructions. The computer code 97 includes, inter alia, an algorithm used for collaborative information development according to the present invention. The processor 91 executes the computer code 97.

The memory device 94 includes input data 96. The input data 96 includes input required by the computer code 97. The output device 93 displays output from the computer code 97. Either or both memory devices 94 and 95 (or one or more additional memory devices not shown in FIG. 3) may be used as a computer usable storage medium (or a computer readable storage medium or a program storage device) having a computer readable program embodied therein and/or having other data stored therein, wherein the computer readable program comprises the computer code 97. Generally, a computer program product (or, alternatively, an article of manufacture) of the computer system 90 may comprise said computer usable storage medium (or said program storage device).

While FIG. 3 shows the computer system 90 as a particular configuration of hardware and software, any configuration of hardware and software, as would be known to a person of ordinary skill in the art, may be utilized for the purposes stated supra in conjunction with the particular computer system 90 of FIG. 3. For example, the memory devices 94 and 95 may be portions of a single memory device rather than separate memory devices.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method for collaboratively developing information, the method comprising:

storing, by an information delivery system (IDS) program of an IDS, an information set and a vocabulary in an IDS data storage of the IDS, wherein the content owner authors the information set and the vocabulary for describing information represented by the information set, wherein the information set comprises at least one item that represents a respective information, wherein the vocabulary defined by the content owner comprises at least one pair (T, C(T)) of a term T and a respective confidence level associated with the term C(T), wherein the respective confidence level C(T) represents how reliable a statement comprising the term T is;

receiving an annotation with respect to an item of said at least one item from a contributing user, wherein the annotation comprises an assertion and a user identifier of the contributing user, wherein the contributing user creates the assertion commenting information represented in the item; and integrating the item with the received annotation such that the integrated item replaces the item created by the content owner within the information set stored in the IDS data storage and such that the integrated item represents information collaboratively developed by the content owner as well as the contributing user identified by the user identifier, wherein said storing, said receiving, and said integrating are performed by the IDS program.

2. The method of claim 1, said receiving comprising:

determining that the user identifier of the contributing user is listed in an access control list that is stored in the IDS data storage, wherein the access control list comprises at least one user identifier respectively associated with each user of the IDS who is permitted to modify the information set; and subsequent to said determining, storing, in the IDS data storage, the annotation provided by the contributing user having the user identifier enlisted in the access control list.

3. The method of claim 1, said receiving comprising:
storing, in the IDS data storage, the annotation provided by the contributing user having the user identifier, wherein the item is configured by the content owner as being accessible without authorization of the contributing user.

4. The method of claim 1, said integrating comprising:
determining that the assertion of the received annotation comprises a first term T1 that is defined in the vocabulary;
discovering that the assertion comprising the first term T1 commenting the item is reliable as a result of finding that the confidence level C(T1) of the first term T1 in said assertion is greater than or equal to a threshold confidence level associated with the item as defined by the content owner; and
updating the item by storing said annotation in the information set in relation to the item in the IDS data storage.

5. The method of claim 1, said integrating comprising:
determining that the assertion of the received annotation comprises a first term T1 that is defined in the vocabulary;
discovering that the assertion comprising the first term T1 commenting the item is reliable as a result of finding that the confidence level C(T1) of the first term T1 in said assertion is greater than or equal to a threshold confidence level associated with the item as defined by the content owner;
discovering that the contributing user identified by the user identifier who provided the assertion is authorized to post the annotation to the information set; and
storing said annotation in the information set in the IDS data storage.

6. The method of claim 1, said integrating comprising:
determining that the assertion of the received annotation comprises a first term T1 that is defined in the vocabulary;
discovering that the assertion comprising the first term T1 commenting the item is not reliable as a result of finding that the confidence level C(T1) of the first term T1 in said assertion is less than a threshold confidence level associated with the item as defined by the content owner; and
notifying the content owner that the confidence level of said assertion is less than the threshold confidence level such that the content owner adjust the threshold confidence level requested for the assertion related to the item to integrate the annotation with the item.

7. The method of claim 1, said integrating comprising:
determining that the assertion of the received annotation comprises a first term T1 that is defined in the vocabulary;
discovering that the assertion comprising the first term T1 commenting the item is not reliable as a result of finding that the confidence level C(T1) of the first term T1 in said assertion is less than a threshold confidence level associated with the item as defined by the content owner;
notifying the content owner that the confidence level of said assertion is less than the threshold confidence level;
receiving, from the content owner responsive to said notifying, a confidence value adjusting the confidence level of said assertion; and storing the annotation that is updated with the received confidence value in the IDS data storage in association with the item.

8. The method of claim 1, the method further comprises:
receiving a user request from a requesting user of the IDS, wherein the user request is selected from the group consisting of a search request and an access request, wherein the search request demands the IDS program to search the information set for information in the information set associated with a search confidence level specified by the requesting user, wherein the access request demands the IDS program to enlist the requesting user in an access control list such that the requesting user access the information set stored in the IDS data storage; and
fulfilling the user request as directed in the user request by searching the information set responsive to the received search request, wherein the search request comprises a search term that is defined in the vocabulary, or by adding a user identifier of the requesting user to the access control list responsive to the access request.

9. A computer program product, comprising a computer usable storage medium having a computer readable program code embodied therein, said computer readable program code containing instructions that when executed by a processor of a computer system implement a method for collaboratively developing information, the method comprising:
storing, by an information delivery system (IDS) program of an IDS, an information set and a vocabulary in an IDS data storage of the IDS, wherein the content owner authors the information set and the vocabulary for describing information represented by the information set, wherein the information set comprises at least one item that represents a respective information, wherein the vocabulary defined by the content owner comprises at least one pair (T, C(T)) of a term T and a respective confidence level associated with the term C(T), wherein the respective confidence level C(T) represents how reliable a statement comprising the term T is;
receiving an annotation with respect to an item of said at least one item from a contributing user, wherein the annotation comprises an assertion and a user identifier of the contributing user, wherein the contributing user creates the assertion commenting information represented in the item; and
integrating the item with the received annotation such that the integrated item replaces the item created by the content owner within the information set stored in the IDS data storage and such that the integrated item represents information collaboratively developed by the content owner as well as the contributing user identified by the user identifier,
wherein said storing, said receiving, and said integrating are performed by the IDS program.

10. The computer program product of claim 9, said receiving comprising:
determining that the user identifier of the contributing user is listed in an access control list that is stored in the IDS data storage, wherein the access control list comprises at least one user identifier respectively associated with each user of the IDS who is permitted to modify the information set; and
subsequent to said determining, storing, in the IDS data storage, the annotation provided by the contributing user having the user identifier enlisted in the access control list.

11. The computer program product of claim 9, said receiving comprising:
  storing, in the IDS data storage, the annotation provided by the contributing user having the user identifier, wherein the item is configured by the content owner as being accessible without authorization of the contributing user.

12. The computer program product of claim 9, said integrating comprising:
  determining that the assertion of the received annotation comprises a first term T1 that is defined in the vocabulary;
  discovering that the assertion comprising the first term T1 commenting the item is reliable as a result of finding that the confidence level C(T1) of the first term T1 in said assertion is greater than or equal to a threshold confidence level associated with the item as defined by the content owner; and
  updating the item by storing said annotation in the information set in relation to the item in the IDS data storage.

13. The computer program product of claim 9, said integrating comprising:
  determining that the assertion of the received annotation comprises a first term T1 that is defined in the vocabulary;
  discovering that the assertion comprising the first term T1 commenting the item is reliable as a result of finding that the confidence level C(T1) of the first term T1 in said assertion is greater than or equal to a threshold confidence level associated with the item as defined by the content owner;
  discovering that the contributing user identified by the user identifier who provided the assertion is authorized to post the annotation to the information set; and
  storing said annotation in the information set in the IDS data storage.

14. The computer program product of claim 9, said integrating comprising:
  determining that the assertion of the received annotation comprises a first term T1 that is defined in the vocabulary;
  discovering that the assertion comprising the first term T1 commenting the item is not reliable as a result of finding that the confidence level C(T1) of the first term T1 in said assertion is less than a threshold confidence level associated with the item as defined by the content owner; and
  notifying the content owner that the confidence level of said assertion is less than the threshold confidence level such that the content owner adjust the threshold confidence level requested for the assertion related to the item to integrate the annotation with the item.

15. The computer program product of claim 9, said integrating comprising:
  determining that the assertion of the received annotation comprises a first term T1 that is defined in the vocabulary;
  discovering that the assertion comprising the first term T1 commenting the item is not reliable as a result of finding that the confidence level C(T1) of the first term T1 in said assertion is less than a threshold confidence level associated with the item as defined by the content owner;
  notifying the content owner that the confidence level of said assertion is less than the threshold confidence level;
  receiving, from the content owner responsive to said notifying, a confidence value adjusting the respective confidence level of said assertion; and
  storing the annotation that is updated with the received confidence value in the IDS data storage in association with the item.

16. The computer program product of claim 9, the method further comprises:
  receiving a user request from a requesting user of the IDS, wherein the user request is selected from the group consisting of a search request and an access request, wherein the search request demands the IDS program to search the information set for information in the information set associated with a search confidence level specified by the requesting user, wherein the access request demands the IDS program to enlist the requesting user in an access control list such that the requesting user access the information set stored in the IDS data storage; and
  fulfilling the user request as directed in the user request by searching the information set responsive to the received search request, wherein the search request comprises a search term that is defined in the vocabulary, or by adding a user identifier of the requesting user to the access control list responsive to the access request.

17. A computer system comprising a processor and a computer readable memory unit coupled to the processor, said memory unit containing instructions that when executed by the processor implement a method for collaboratively developing information, the method comprising:
  storing, by an information delivery system (IDS) program of an IDS, an information set and a vocabulary in an IDS data storage of the IDS, wherein the content owner authors the information set and the vocabulary for describing information represented by the information set, wherein the information set comprises at least one item that represents a respective information, wherein the vocabulary defined by the content owner comprises at least one pair (T, C(T)) of a term T and a respective confidence level associated with the term C(T), wherein the respective confidence level C(T) represents how reliable a statement comprising the term T is;
  receiving an annotation with respect to an item of said at least one item from a contributing user, wherein the annotation comprises an assertion and a user identifier of the contributing user, wherein the contributing user creates the assertion commenting information represented in the item; and
  integrating the item with the received annotation such that the integrated item replaces the item created by the content owner within the information set stored in the IDS data storage and such that the integrated item represents information collaboratively developed by the content owner as well as the contributing user identified by the user identifier, wherein said storing, said receiving, and said integrating are performed by the IDS program.

18. The computer system of claim 17, said integrating comprising:
  determining that the assertion of the received annotation comprises a first term T1 that is defined in the vocabulary;
  discovering that the assertion comprising the first term T1 commenting the item is reliable as a result of finding that the confidence level C(T1) of the first term T1 in said assertion is greater than or equal to a threshold confidence level associated with the item as defined by the content owner; and
  updating the item by storing said annotation in the information set in relation to the item in the IDS data storage.

19. The computer system of claim 17, said integrating comprising:
- determining that the assertion of the received annotation comprises a first term T1 that is defined in the vocabulary;
- discovering that the assertion comprising the first term T1 commenting the item is not reliable as a result of finding that the confidence level C(T1) of the first term T1 in said assertion is less than a threshold confidence level associated with the item as defined by the content owner;
- notifying the content owner that the confidence level of said assertion is less than the threshold confidence level;
- receiving, from the content owner responsive to said notifying, a confidence value adjusting the confidence level of said assertion; and
- storing the annotation that is updated with the received confidence value in the IDS data storage in association with the item.

20. The computer system of claim 17, the method further comprises:
- receiving a user request from a requesting user of the IDS, wherein the user request is selected from the group consisting of a search request and an access request, wherein the search request demands the IDS program to search the information set for information in the information set associated with a search confidence level specified by the requesting user, wherein the access request demands the IDS program to enlist the requesting user in an access control list such that the requesting user access the information set stored in the IDS data storage; and
- fulfilling the user request as directed in the user request by searching the information set responsive to the received search request, wherein the search request comprises a search term that is defined in the vocabulary, or by adding a user identifier of the requesting user to the access control list responsive to the access request.

* * * * *